United States Patent
Hsiao et al.

(10) Patent No.: US 8,110,085 B2
(45) Date of Patent: Feb. 7, 2012

(54) ASSISTED DEPOSITION, NARROW TRENCH DAMASCENE PROCESS FOR MANUFACTURING A WRITE POLE OF A MAGNETIC WRITE HEAD

(75) Inventors: Wen-Chien David Hsiao, San Jose, CA (US); Yinshi Liu, Foster City, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 492 days.

(21) Appl. No.: 12/345,828

(22) Filed: Dec. 30, 2008

(65) Prior Publication Data

US 2010/0163422 A1    Jul. 1, 2010

(51) Int. Cl.
*C25D 5/02* (2006.01)
*G11B 5/127* (2006.01)
*H04R 31/00* (2006.01)

(52) U.S. Cl. .................. 205/119; 29/603.14; 29/603.16; 360/110

(58) Field of Classification Search .................. 205/119; 360/110; 29/603.13, 603.14, 603.16
See application file for complete search history.

(56) References Cited

U.S. PATENT DOCUMENTS

| | | | |
|---|---|---|---|
| 6,710,973 B2 | 3/2004 | Okada et al. .................. | 360/125 |
| 6,813,116 B2 | 11/2004 | Nakamura et al. ............ | 360/125 |
| 2006/0132972 A1 | 6/2006 | Tagami et al. ................ | 360/126 |
| 2006/0176614 A1 | 8/2006 | Matono ........................ | 360/126 |
| 2007/0008649 A1 | 1/2007 | Sasaki et al. .................. | 360/126 |
| 2007/0177301 A1 | 8/2007 | Han et al. ...................... | 360/126 |
| 2007/0211379 A1 | 9/2007 | Kato et al. ..................... | 360/126 |
| 2007/0247752 A1 | 10/2007 | Otagiri et al. ................. | 360/126 |

FOREIGN PATENT DOCUMENTS

| | | |
|---|---|---|
| JP | 2002/216315 | 8/2002 |
| JP | 2006/073058 | 3/2006 |
| JP | 2006/139848 | 6/2006 |

OTHER PUBLICATIONS

Okada et al., "Fabrication Process for a Trapezoidal Main Pole for Single-Pole-Type Heads" IEEE Transactions on Magnetics, vol. 38, No. 5, Sep. 2002.

*Primary Examiner* — Luan Van
(74) *Attorney, Agent, or Firm* — Zilka-Kotab, PC

(57) ABSTRACT

A method for forming a magnetic write head using a damascene process that does not form voids in the magnetic structure. An opening is formed in an alumina layer, the opening being configured to define a trench. Then a first layer of magnetic material is deposited into the trench. A CMP process is then performed to remove any voids that have formed in the first magnetic layer. Then a second layer of magnetic material is deposited over the first layer of magnetic material. In another embodiment of the invention, a opening is formed in the alumina layer, and a first layer of magnetic material is electroplated into the opening. A thin layer of non-magnetic material is then deposited, and a second layer of magnetic material is deposited over the thin layer of non-magnetic material. The thin layer of alumina advantageously provides a laminate structure that avoids data erasure.

25 Claims, 31 Drawing Sheets

ASSISTED DEPOSITION, NARROW TRENCH DAMASCENE PROCESS FOR MANUFACTURING A WRITE POLE OF A MAGNETIC WRITE HEAD

FIELD OF THE INVENTION

The present invention relates to perpendicular magnetic recording and more particularly to a method for manufacturing a narrow track-width write pole using a Damascene process.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

SUMMARY OF THE INVENTION

The present invention provides a method for forming a magnetic write head using a damascene process that does not form voids in the magnetic structure. An opening is formed in an alumina layer, the opening being configured to define a trench. Then a first layer of magnetic material is deposited into the trench. A CMP process is then performed to remove any voids that have formed in the first magnetic layer. Then a second layer of magnetic material is deposited over the first layer of magnetic material.

In another embodiment of the invention, a opening is formed in the alumina layer, and a first layer of magnetic material is electroplated into the opening. A thin layer of non-magnetic material is then deposited, and a second layer of magnetic material is deposited over the thin layer of non-magnetic material. The thin layer of alumina advantageously provides a laminate structure that avoids data erasure.

Conventional Damascene process has been used in thin film head industry to form perpendicular magnetic writer. In general, a single layer high moment magnetic material is electrically plated into a trench, followed by a CMP process. On one hand, Damascene pole formation process is simpler, and ensures tighter pole track-width control compared to dry pole process such as ion milling pole formation. However, pole erasure from non-laminated single layer plated magnetic material is always a big concern, as well as reduced corrosion resistance as compared with sputter deposited or ion beam deposited material. Magnetic properties of plated material in general are also more difficult to control as compared with deposited magnetic material. Thus, a Damascene pole with sputter deposition or ion beam deposition is preferred, but such a process has been limited by technical barriers with regard to defect formation from deposition into high aspect ratio narrow trench structure.

The present invention provides unique methods to solve deposition challenges in high aspect ratio trench, and forms a bi-layer laminated pole with Damascene process benefit of tight pole track-width control.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
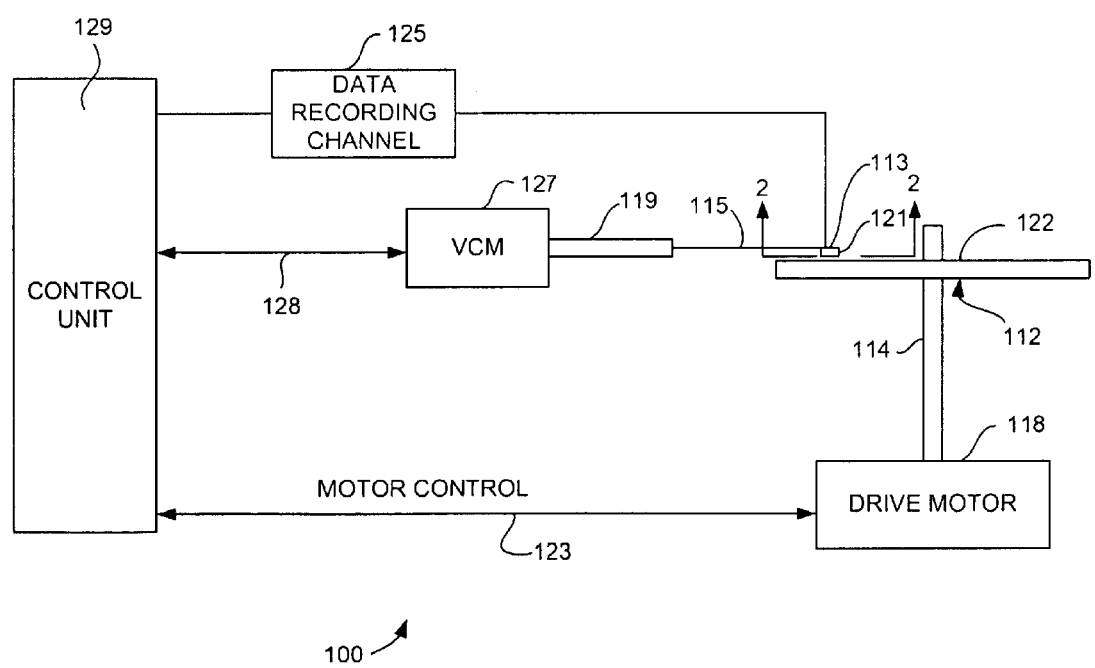
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
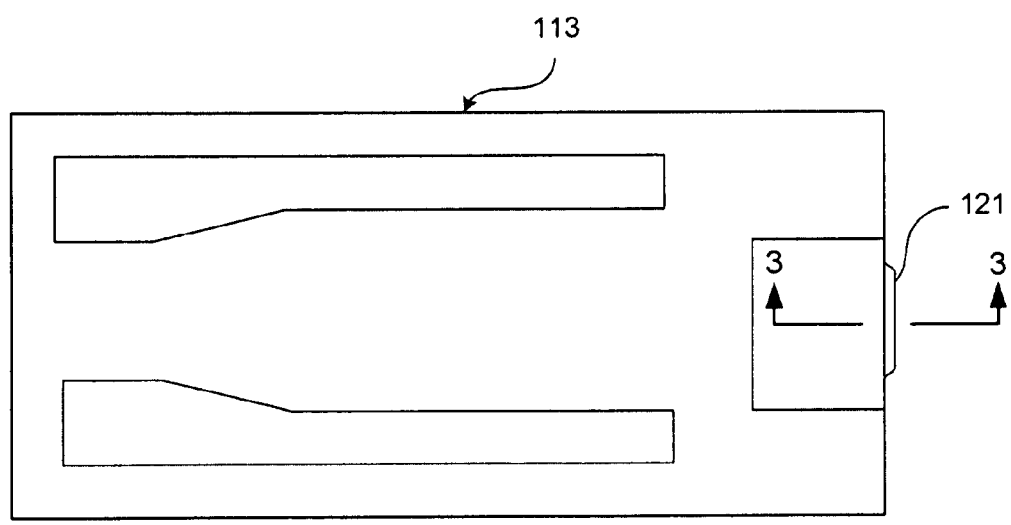
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
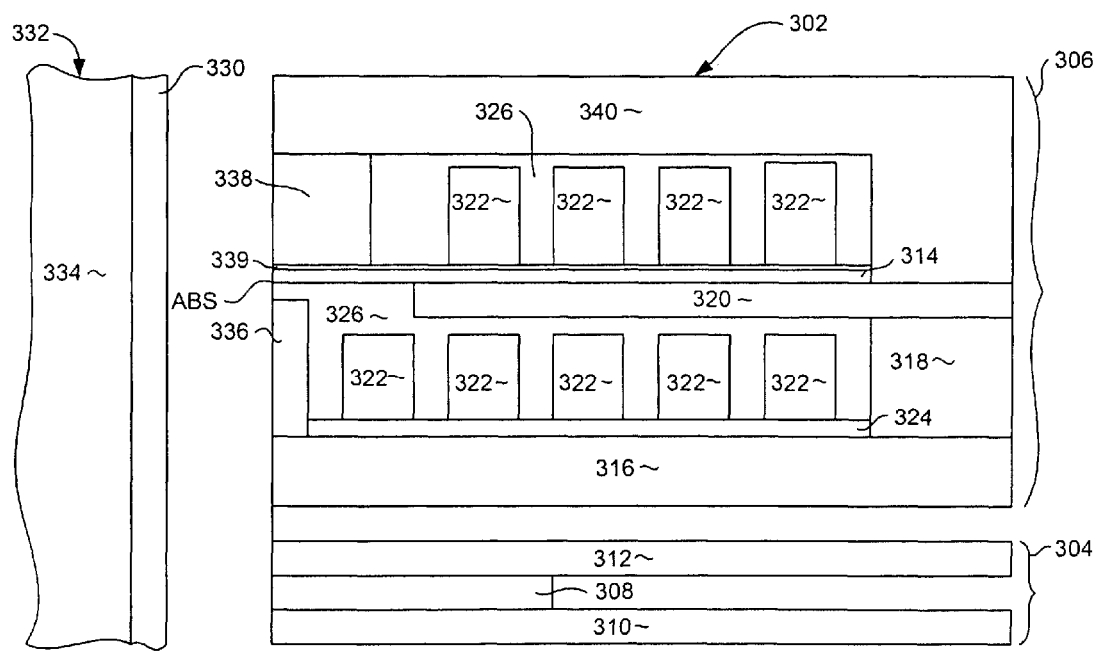
FIG. 3 is a cross sectional view of a magnetic head, taken from line 3-3 of FIG. 2 and rotated 90 degrees counterclockwise, of a magnetic head according to an embodiment of the present invention.

With reference now to FIG. 3, the invention can be embodied in a magnetic head 302. The magnetic head 302 includes a read head 304 and a write head 306. The read head 304 includes a magnetoresistive sensor 308, which can be a GMR, TMR, or some other type of sensor. The magnetoresistive sensor 308 is located between first and second magnetic shields 310, 312.

The write head 306 includes a magnetic write pole 314 and a magnetic return pole 316. The write pole 314 can be formed upon a magnetic shaping layer 320, and a magnetic back gap layer 318 magnetically connects the write pole 314 and shaping layer 320 with the return pole 316 in a region removed from the air bearing surface (ABS). A write coil 322 (shown in cross section in FIG. 3) passes between the write pole and shaping layer 314, 320 and the return pole 316, and may also pass above the write pole 314 and shaping layer 320. The write coil 322 can be a helical coil or can be one or more pancake coils. The write coil 322 can be formed upon an insulation layer 324 and can be embedded in a coil insulation layer 326 such as alumina and or hard baked photoresist.

In operation, when an electrical current flows through the write coil 322. A resulting magnetic field causes a magnetic flux to flow through the return pole 316, back gap 318, shaping layer 320 and write pole 314. This causes a magnetic write field to be emitted from the tip of the write pole 314 toward a magnetic medium 332. The write pole 314 has a cross section at the ABS that is much smaller than the cross section of the return pole 316 at the ABS. Therefore, the magnetic field emitting from the write pole 314 is sufficiently dense and strong that it can write a data bit to a magnetically hard top layer 330 of the magnetic medium 332. The magnetic flux then flows through a magnetically softer under-layer 334, and returns back to the return pole 316, where it is sufficiently spread out and weak that it does not erase the data bit recorded by the write pole 314. A magnetic pedestal 336 may be provided at the air bearing surface ABS and attached to the return pole 316 to prevent stray magnetic fields from the write coil 322 from affecting the magnetic signal recorded to the medium 332.

In order to increase write field gradient, and therefore increase the speed with which the write head 306 can write data, a trailing, wrap-around magnetic shield 338 can be provided. The trailing, wrap-around magnetic shield 338 is separated from the write pole by a non-magnetic layer 339. The trailing shield 338 attracts the magnetic field from the write pole 314, which slightly cants the angle of the magnetic field emitting from the write pole 314. This canting of the write field increases the speed with which write field polarity can be switched by increasing the field gradient. A trailing magnetic return pole 340 can be provided and can be magnetically connected with the trailing shield 338. Therefore, the trailing return pole 340 can magnetically connect the trailing magnetic shield 338 with the back portion of the write pole 302, such as with the back end of the shaping layer 320 and with the back gap layer 318. The magnetic trailing shield is also a second return pole so that in addition to magnetic flux being conducted through the medium 332 to the return pole 316, the magnetic flux also flows through the medium 332 to the trailing return pole 340.

Figure 4:
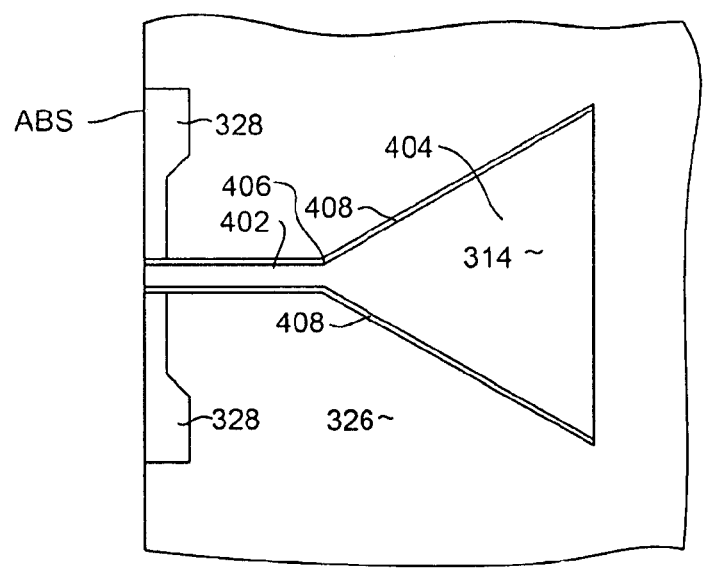
FIG. 4 is a top down view of a write pole of the magnetic head of FIG. 3.

FIG. 4 shows a top down view of the write pole 314. As can be seen, the write pole 314 has a narrow pole tip portion 402 and a wider flared portion 404. The transition from the pole tip region 402 to the flared portion defines a flare point 406. As can be seen, the trailing, wrap-around shield 338 has side shield portions 328 that are separated from the write pole 314 by non-magnetic side gap layers 408.

As the track widths of write heads become ever smaller, the width of the write pole 314 must also be reduced. This reduction of the write pole with presents certain manufacturing challenges, which the present invention addresses. Prior art write pole manufacturing processes have involved depositing a magnetic material and then forming a mask over the write pole material. An ion milling process is then performed to transfer the image of the mask onto the underlying write pole material. However, as the width of the write pole decreases so does the width of the mask structure. This narrow mask structure cannot be manufactured sufficiently strong, and tends to bend, fall over or otherwise deform. The present invention provides methods for manufacturing a write pole that overcomes these challenges, allowing the write pole to be manufactured with a very narrow track-width.

Figure 5:
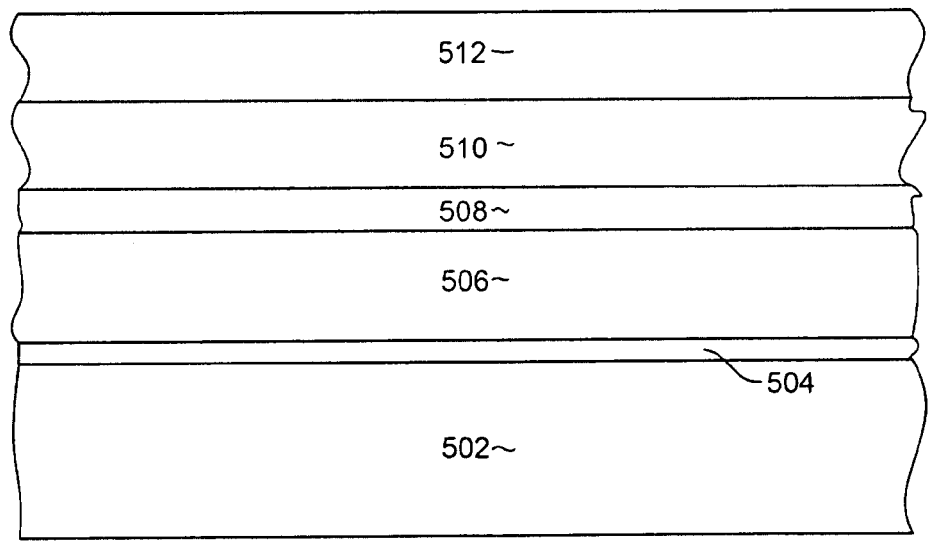
FIGS. 5-16 are views of a write head in various intermediate stages of manufacture, illustrating a method of manufacturing a magnetic write head according to an embodiment of the invention.
Figure 6:
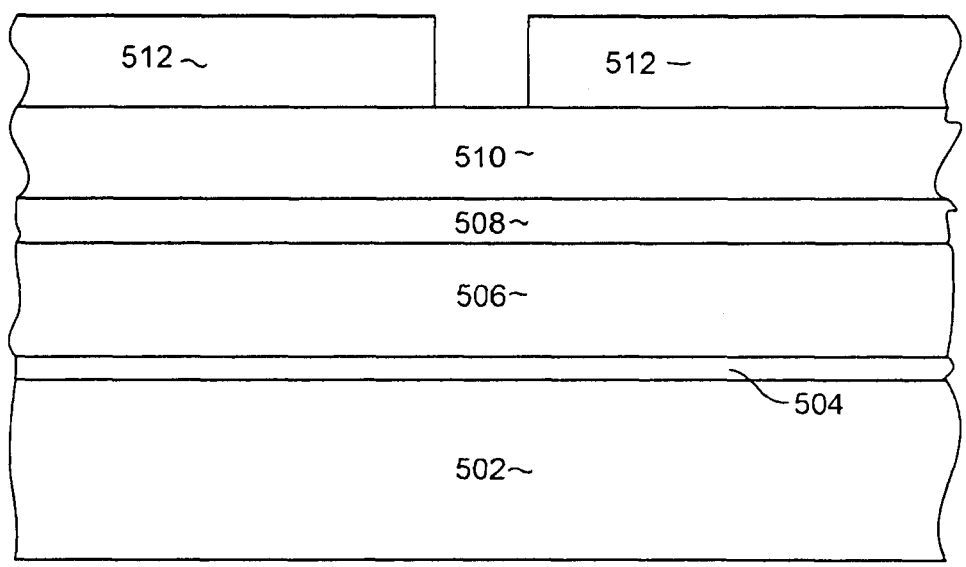

FIGS. 5-15 illustrate a method of manufacturing a write pole according to one possible embodiment of the invention. With particular reference to FIG. 5, a substrate 502 is provided. The substrate can include all or a portion of the shaping layer 320 and also can include a portion of the insulation layer 326 described above with reference to FIG. 3. A layer of material that is resistant to reactive ion etching (RIE stop layer) 504 is deposited over the substrate. This RIE stop layer 504 can be constructed of Ru or Rh, NiCr, Cr.

A layer of alumina 506 is deposited over the RIE stop layer 504. A second layer of material that is resistant to reactive ion etching (RIE mask) 508 is deposited over the alumina layer 506. An image transfer layer 510 is deposited over the RIE mask layer 508. The image transfer layer can be a soluble polyimide material such as DURAMIDE®. A resist layer 512 is then deposited over the image transfer layer 510. Then, with reference to FIG. 6, the resist layer 512 is photolithographically patterned and developed to form an opening that defines a desired write pole shape.

Figure 7:
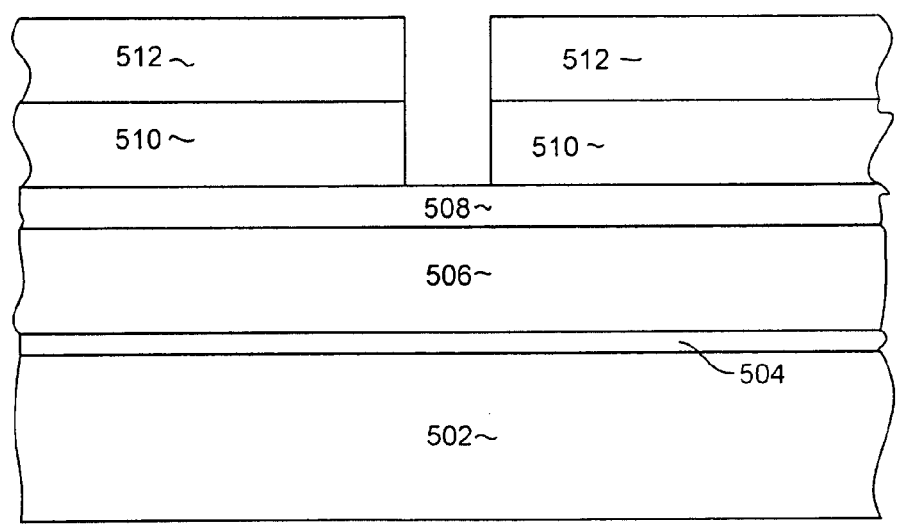
Figure 8:
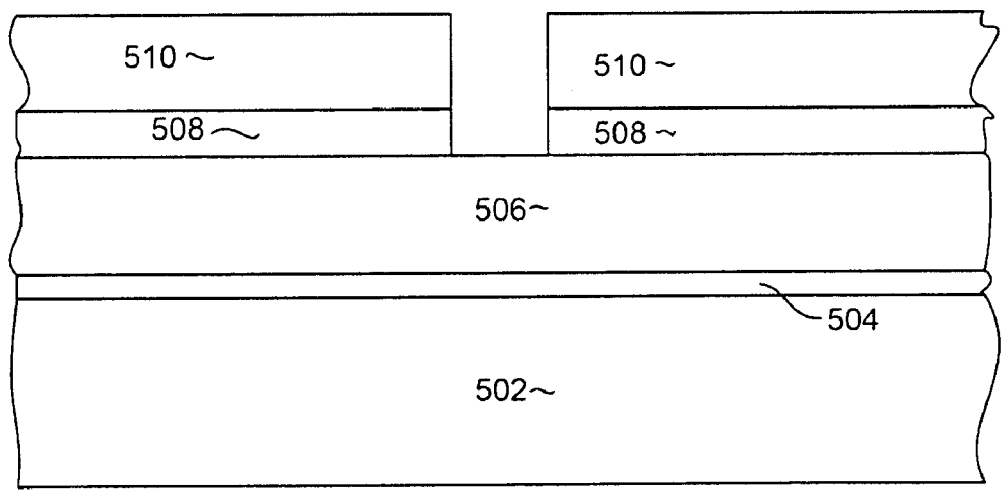
Figure 9:
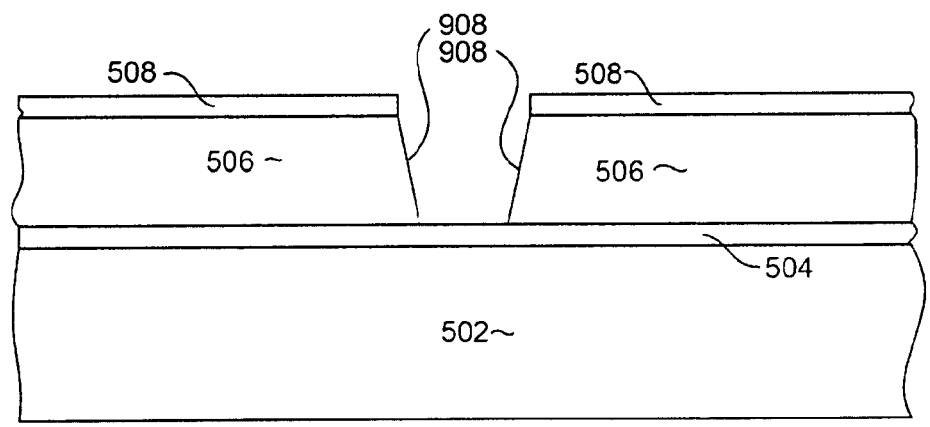

Then, a reactive ion etching (RIE) is performed to remove portions of the image transfer layer 510 that are not protected by the resist mask 512, resulting in a structure such as shown in FIG. 7. Then, another material removal process such as ion milling or another reactive ion etching is performed to remove portions of the RIE mask 508 that are not protected by the image transfer layer 510, thereby transferring the image of the image transfer layer onto the underlying RIE mask 508. This material removal process also most likely consumes all or most of the resist mask, leaving a structure such as that shown in FIG. 8. Then, another reactive ion etching (RIE) is performed, using a chlorine based chemistry such as $BCL_3/Cl_2$, to remove portions of the alumina layer 506 that are not protected by the RIE mask 508. As can be seen in FIG. 9 this chlorine based RIE also removes a portion of the RIE mask 508. Also as can be seen, the RIE forms inward tapered side walls 908 on the alumina layer 506.

Figure 10:
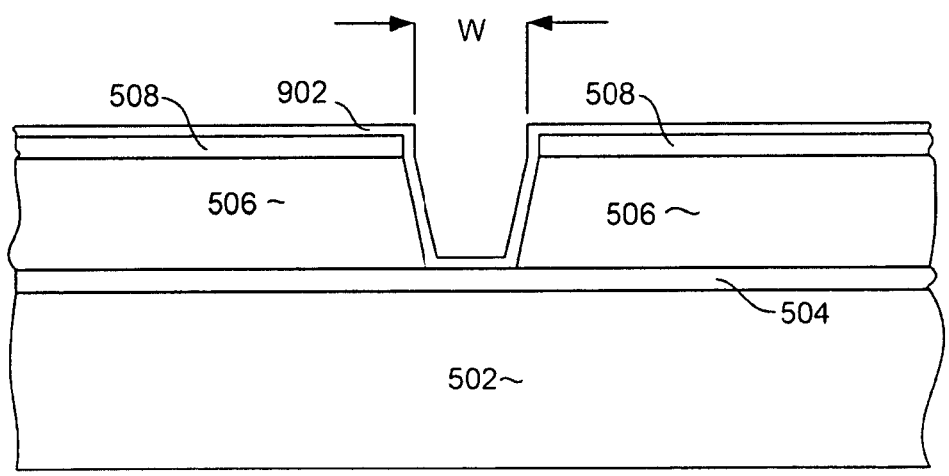
Figure 11:
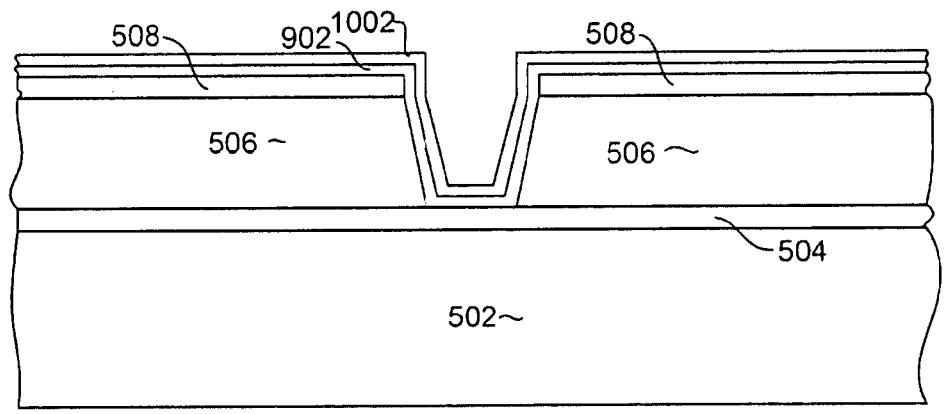

With reference now to FIG. 10, a layer of alumina 902 can be deposited by a conformal deposition method such as atomic layer deposition. The alumina layer 902 can be used to reduce and control the width W of the opening in the alumina layer 506. Therefore thickness to which the alumina layer 902 is deposited depends upon how much the width W is to be reduced. A thin layer 1002 of a material that is resistant to chemical mechanical polishing (CMP stop layer) is then deposited as shown in FIG. 11. The CMP stop layer is preferably Ru.

Figure 12:
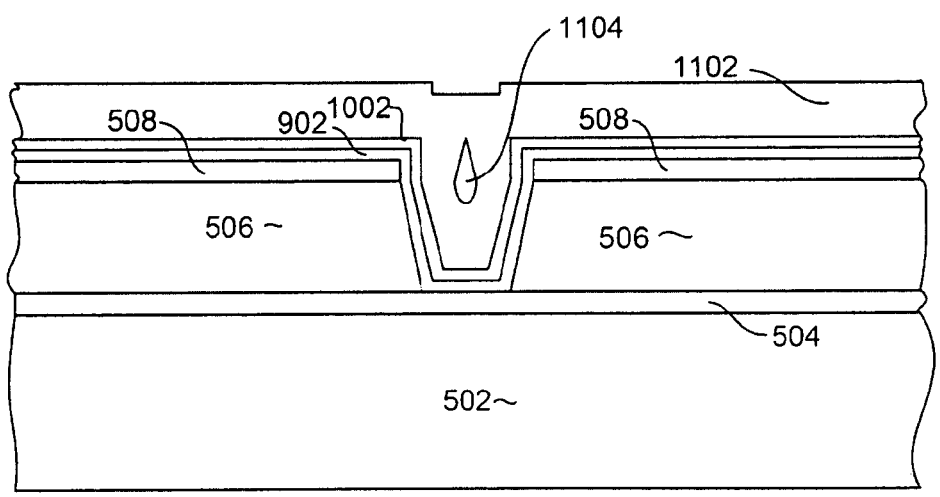
Figure 13:
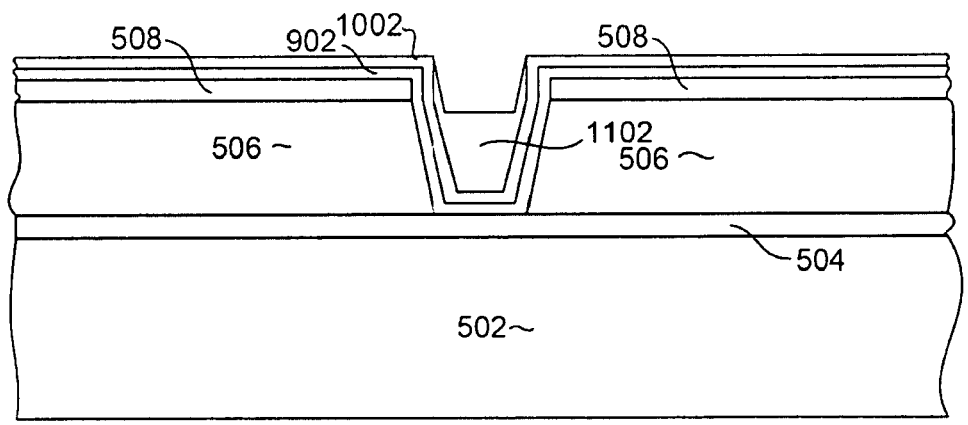
Figure 14:
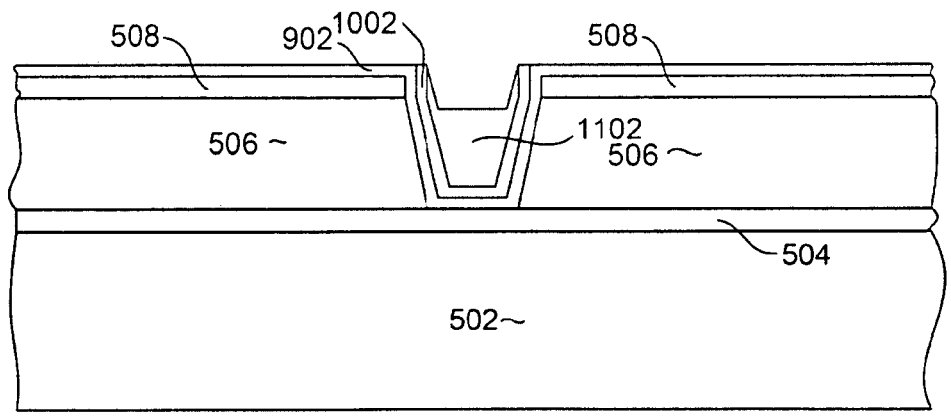

With reference now to FIG. 12, a first layer of magnetic material 1102 is deposited. The deposition of this magnetic layer 1102 into the deep narrow trench of the alumina layer 406 results in a void 1104 being formed. However, a chemical mechanical polishing process (CMP) is then performed, which removes a large portion of the magnetic material 1102 and also removes the void 1104, resulting in a structure as shown in FIG. 13. A quick ion milling can then be performed to remove portions of the CMP stop layer 1002 outside of the trench, resulting in a structure as shown in FIG. 14.

Figure 15:
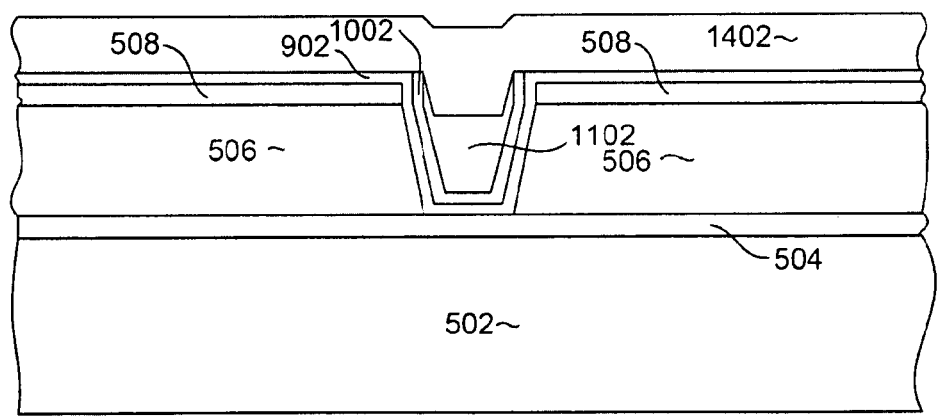
Figure 16:
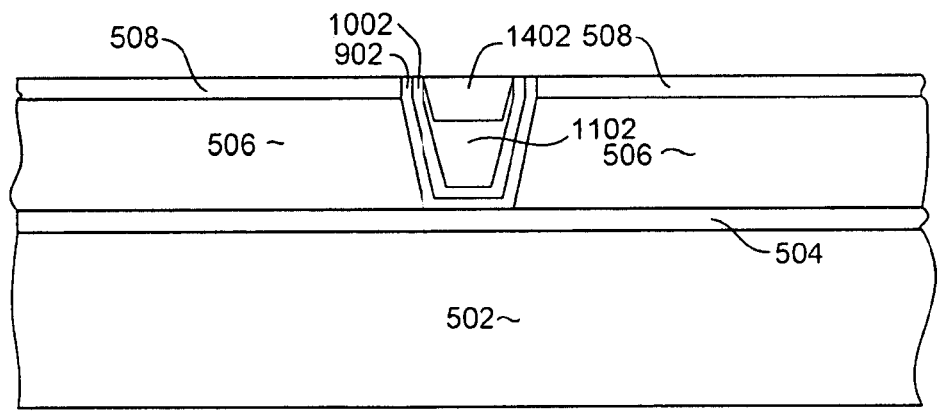
Figure 17:
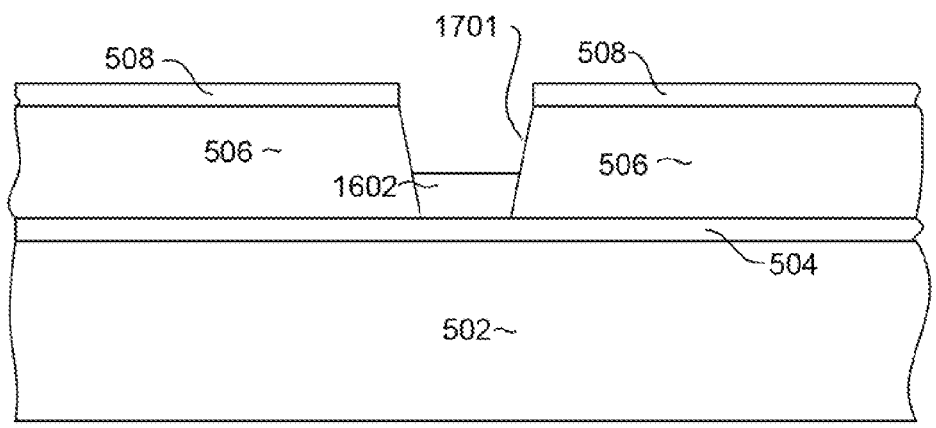
FIGS. 17-20 are views of a write head in various intermediate stages of manufacture, illustrating a method of manufacturing a magnetic write head according to an alternate embodiment of the invention.
Figure 18:
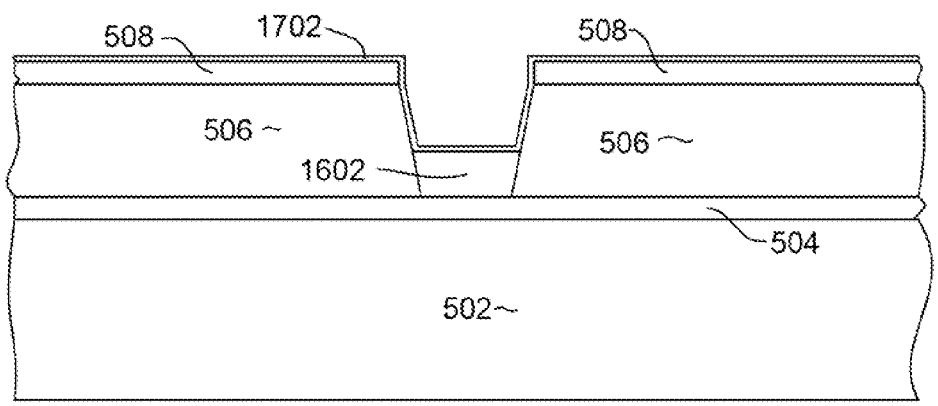

A second magnetic layer 1402 can then be deposited, leaving a structure as shown in FIG. 15. In this embodiment, both the first and second magnetic layers 1102, 1402 can be deposited by sputter deposition or ion beam deposition. Another chemical mechanical polishing can then be performed, removing the portion of layer 1002 over layer 508 and stopping at layer 508, leaving a structure such as that shown in FIG. 16.

An alternative process choice for FIG. 10 to FIG. 13 is that an ion milling process can be used together with deposition of layer 1102 into the trench structure so that void 1104 will not be formed. After portion of 1102 is deposited into the trench and also over 1002, ion milling at angle around 30 degree from layer 508 plane will be applied to remove the portion of deposited layer 1102 near trench opening without removing much of portion of deposited layer 1102 inside the trench thanks to ion milling shadowing effect. By repeating sequences of deposition and ion milling, layer 1102 can be deposited into the trench without void 1104 formation, thus the CMP process described in FIG. 13 and second deposition 1402 and CMP after that in FIG. 15 and FIG. 16 can be eliminated.

Another alternative to process described in FIG. 5 to FIG. 16 is explained as the following. As in FIG. 12, instead of depositing 1102 by sputter deposition or ion beam deposition method, 1102 can be electrically plated into the trench so that there will be no void 1104. After CMP process described in FIG. 13, a thin non-magnetic layer like $Al_2O_3$ or NiCr with thickness of about 3 nm can be deposited over 1102 in FIG. 14, followed by layer 1402 deposition in FIG. 15. Thus a bi-layer laminated magnetic pole can be formed, which will have much less pole erasure issue compared to conventional single layer Damascene pole from electrical plating. Another benefit of such hybrid structure of deposited magnetic layer over plated layer is that, better corrosion resistance from the deposited top/cap layer will make any potential subsequent wet etch process free of pole corrosion issue.

The above described method produces a well defined very narrow track width write head that is completely constructed of magnetic material (magnetic layers 1102, 1402. The manufacturing challenges normally presented by the construction of such as narrow track—with write pole are obviated, because there is no narrow mask structure that can bend, tip or otherwise deform during manufacture.

With reference now to FIGS. 17-20, a method for manufacturing a magnetic write pole according to another embodiment of the invention is described. Starting with a structure such as that described above with reference to FIG. 9, a first layer of magnetic material 1602 is deposited into the trench 1701 formed in the alumina layer 506. This magnetic film can be, for example, CoFe or CoNiFe can be deposited in this case, by electroplating. The underlying RIE stop layer 504 can be used as an electroplating seed layer. Then, with reference to FIG. 18, a thin non-magnetic layer 1702 is conformally deposited. This layer 1702 is preferably alumina, deposited at thickness about 2 nm to 3 nm by a conformal deposition method such as atomic layer deposition.

Figure 19:
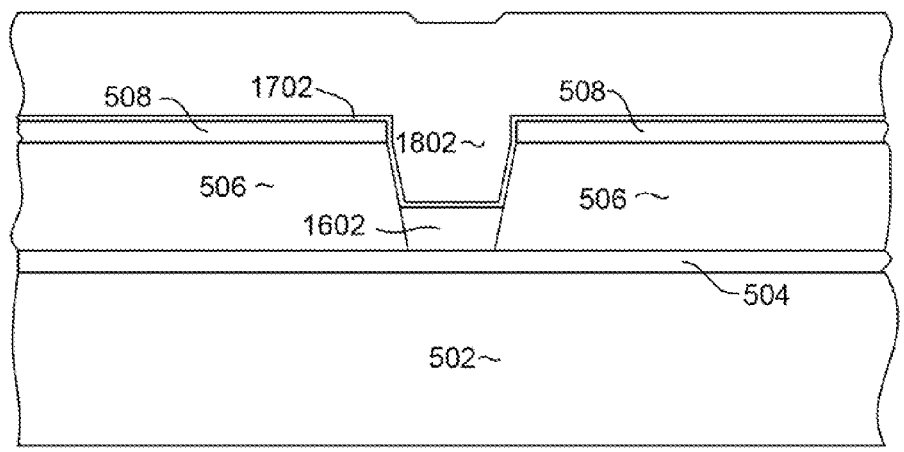
Figure 20:
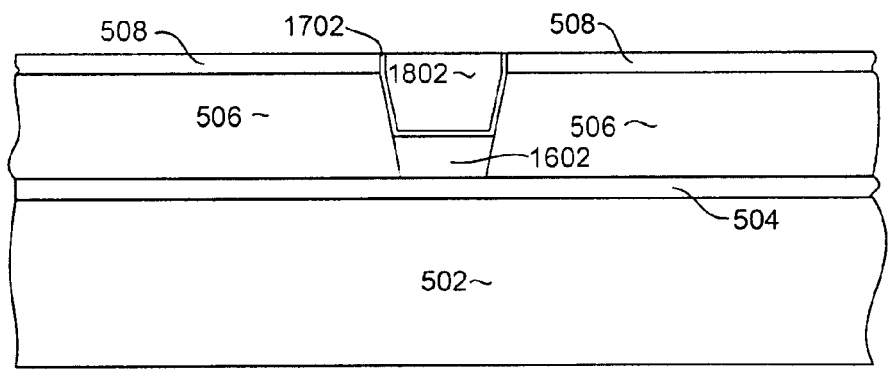

Then, with reference to FIG. 19 a second magnetic layer is deposited. This magnetic layer can be deposited by sputter deposition or ion beam deposition, and can be CoFe, or some other high magnetic moment material like CoNiFe. A chemical mechanical polishing (CMP) can then be performed to planarize the structure and remove excess magnetic material 1802, resulting in the structure as shown in FIG. 20. As can be seen, this process results in a laminate write pole structure having two magnetic layers 1602, 1802 separated by a thin non-magnetic spacer 1702. This structure reduces domain formation and provides faster magnetic switching for increased write speed.

Figure 21:
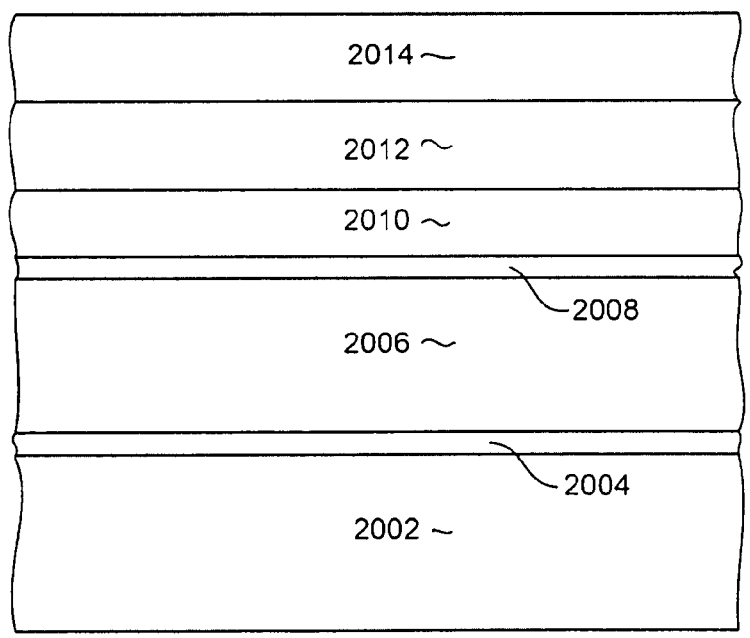
FIGS. 21-30 are views of a write head in various intermediate stages of manufacture, illustrating a method of manufacturing a magnetic write head according to another embodiment of the invention.

FIGS. 21 through 30 illustrate a method for manufacturing a magnetic write pole according to yet another embodiment of the invention. With particular reference to FIG. 21, a substrate 2002 is provided. A RIE stop layer 2004, such as Ru or Rh is deposited over the substrate, followed by an alumina layer 2006. An etch layer 2008, constructed of a material such as TaO or Ta or $Ta_2O_5$ is deposited over the alumina layer 2006. Then, a RIE mask layer 2010, which can be Ru, Rh, NiCr or Cr is deposited over the etch layer 2008. An image transfer layer 2012, which can be a soluble polyimide such as DURAMIDE® is deposited over the RIE mask 2010, and a resist layer 2014 is deposited over the image transfer layer 1012.

Figure 22:
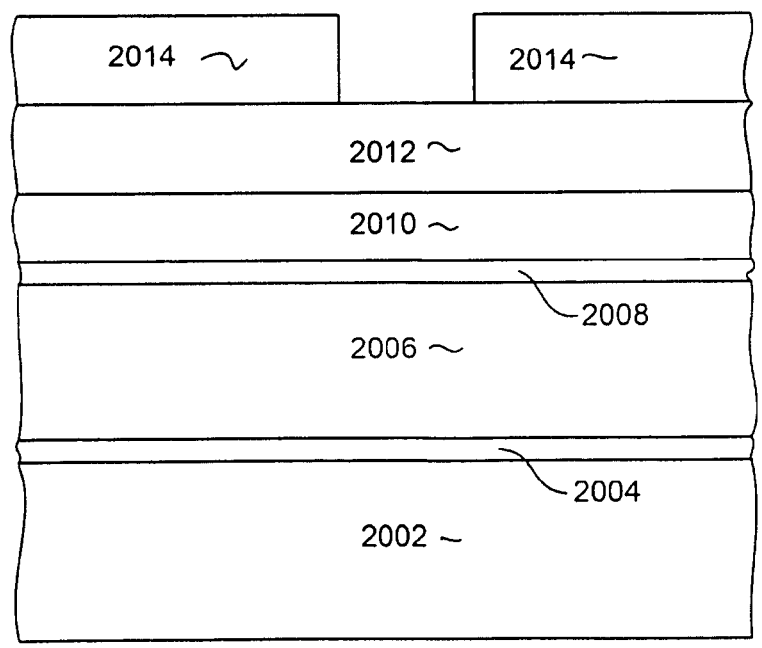
Figure 23:
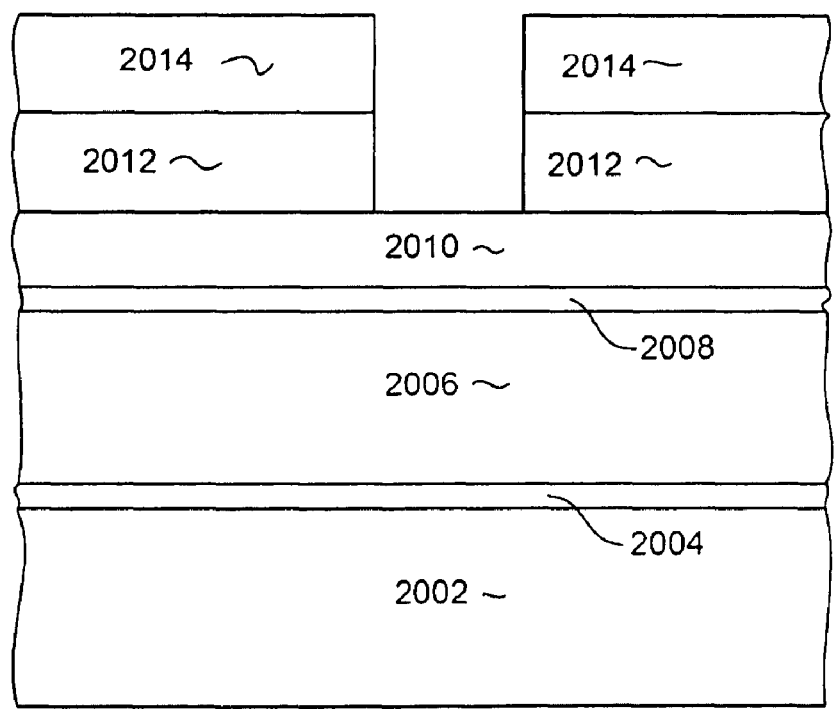

With reference to FIG. 22, the resist layer 2014 is photolithograhically patterned and developed to form it with an opening that is configured to define a write pole. Then, a reactive ion etching (RIE) is performed to remove uncovered portions of the image transfer layer to transfer the image of the resist mask 2014 onto the underlying image transfer layer 2012, resulting in a structure such as that shown in FIG. 23.

Figure 24:
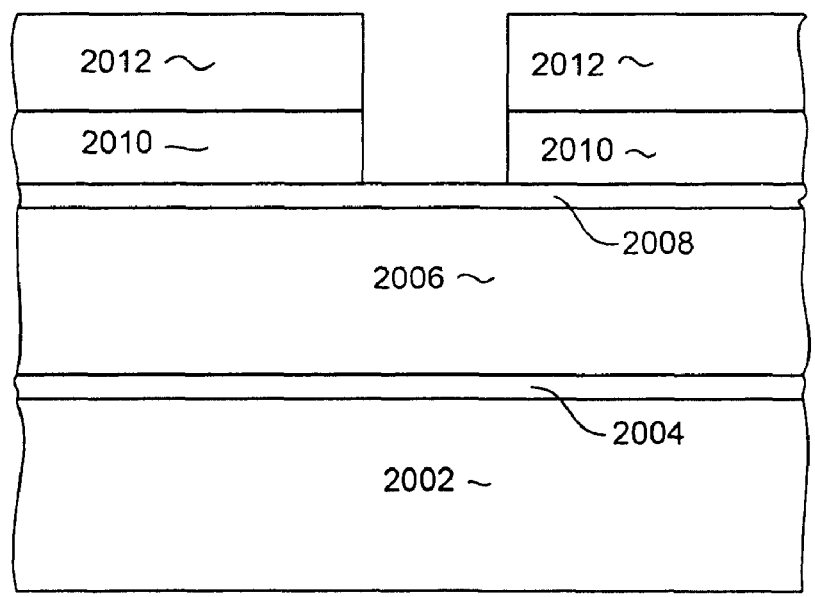
Figure 25:
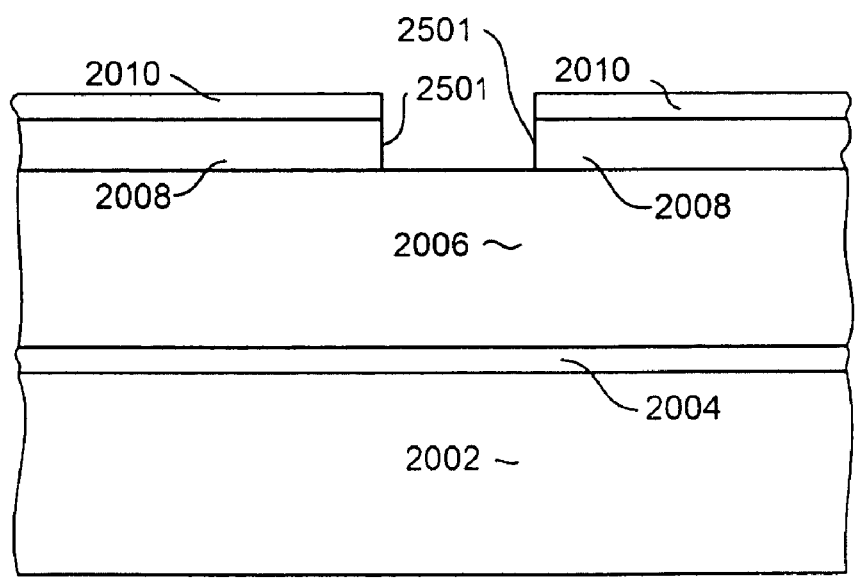
Figure 26:
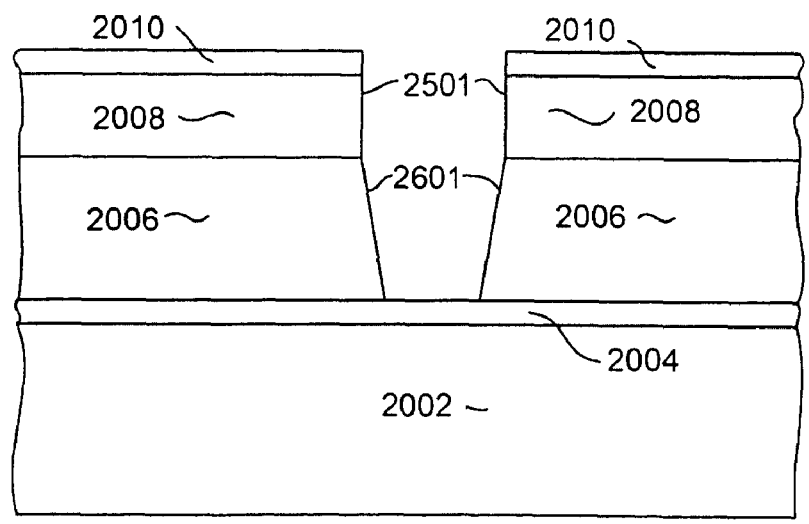

Then, a material removal process such as reactive ion etching or ion milling is performed to transfer the image of the image transfer layer onto the underlying RIE mask 2010, resulting in a structure such as that shown in FIG. 24. Another reactive ion etching with Fluorine chemistry such as $CF_4$, $CHF_3$, $C_3F_8$ or $SF_6$ is then performed to transfer the image of the RIE mask 2010 onto the underlying etch layer 2008. This reactive ion etching results substantially vertical side walls 2501 in a resulting opening in the etch layer 2008 as shown in FIG. 25. Yet another reactive ion etching with Chlorine chemistry such as $BCl_3/Cl_2$ is then performed to remove exposed portions of the alumina layer 2006 forming a structure such as that shown in FIG. 26. As can be seen in FIG. 26, this reactive ion etching results in the alumina layer 2006 having tapered side walls 2601, whereas the side walls 2501 of the etch stop layer 2008 were more vertical.

Figure 27:
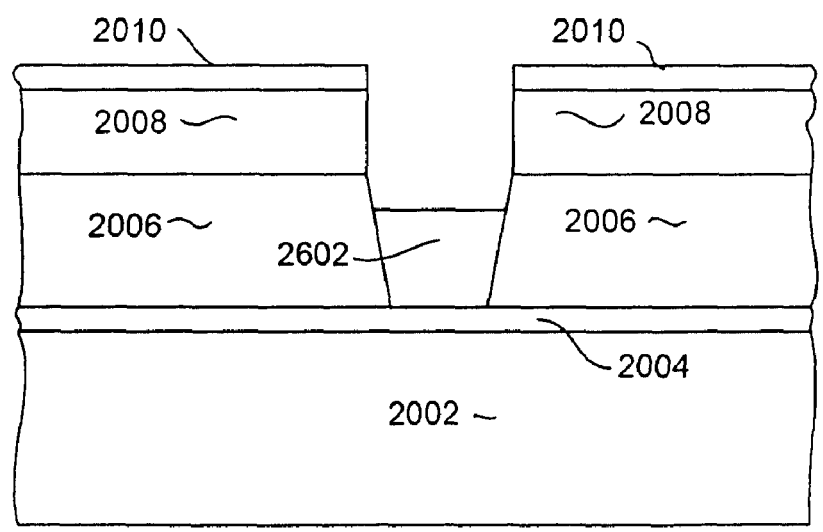
Figure 28:
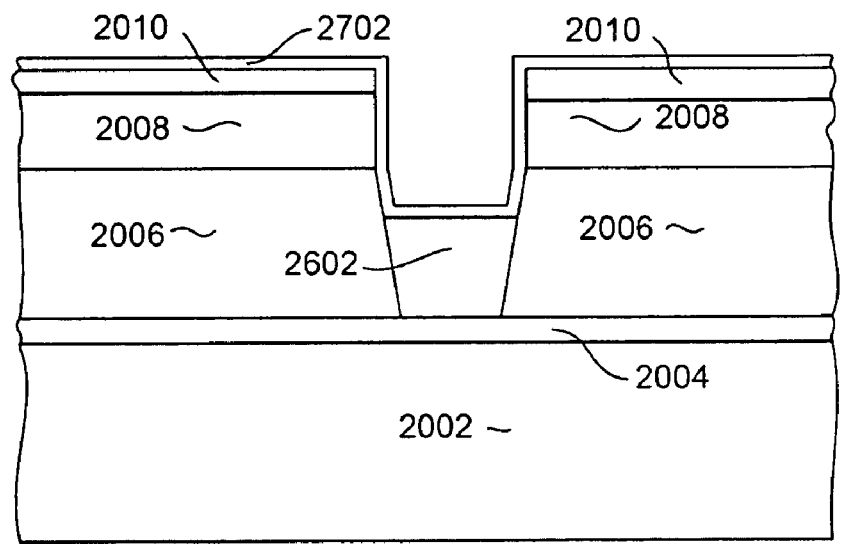
Figure 29:
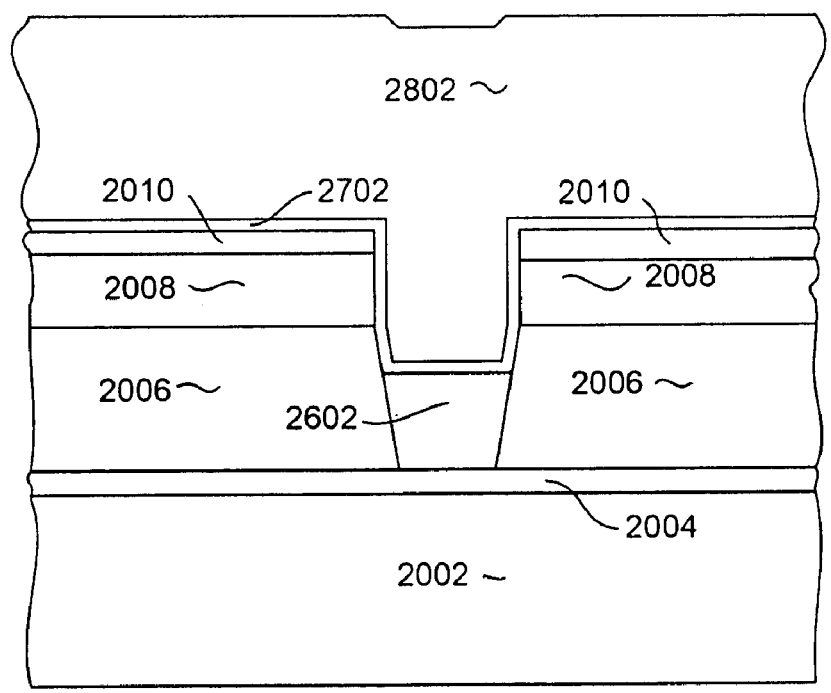
Figure 30:
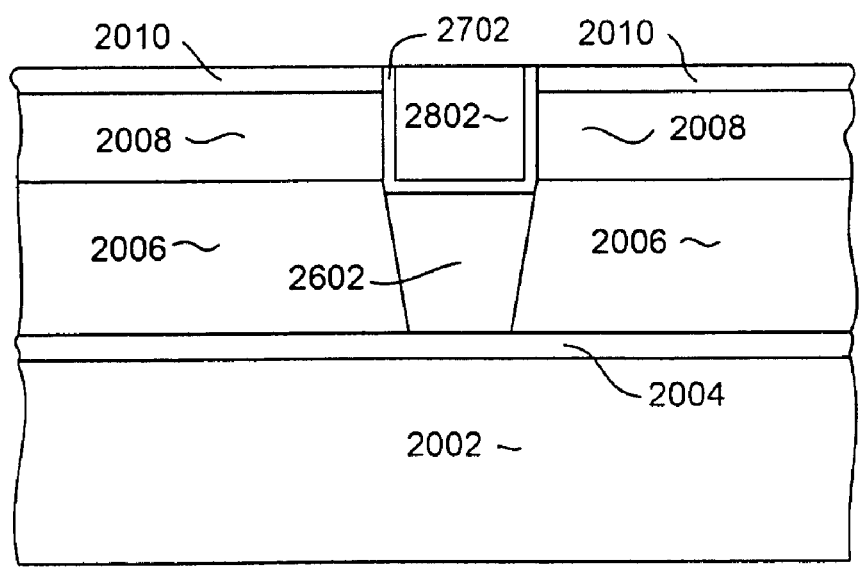

With reference now to FIG. 27, a first magnetic layer 2602 is deposited into the opening formed in the alumina layer 2006. This first magnetic layer 2602 can be a material such as CoFe or CoNiFe and can be deposited by electroplating. Then, a thin layer of alumina with thickness around 3 nm can be deposited by a conformal deposition method (preferably atomic layer deposition), resulting in a structure such as that shown in FIG. 28. A second layer of magnetic material such as CoFe can then be deposited, such as by sputter deposition, leaving a structure as shown in FIG. 29. A chemical mechanical polishing process can then be performed to remove excess magnetic material and planarize the structure, resulting in a structure as shown in FIG. 30.

Figure 31:
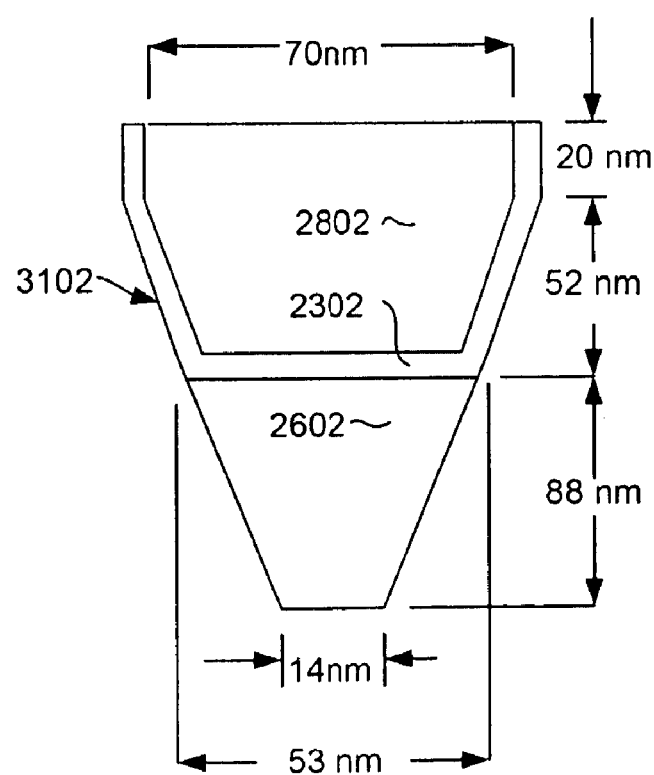
FIG. 31 is a cross sectional view of a write pole of a write head constructed according to the method of FIGS. 21-30.

FIG. 31 shows an example of a write pole structure 3102 that can be constructed using the method just described. The write pole structure 3102 includes the first and second magnetic layers 2602, 2802 and non-magnetic layer 2702. The first magnetic layer 2602 can be formed to have maximum width of, for example 53 nm, and a very small minimum width of 14 nm at the leading edge of the write pole 3102. This first magnetic layer 2602 can have a thickness of 88 nm. As can be seen, the second magnetic layer 2802 can have a portion with sides that taper, similar to the first magnetic layer 2602. However, the second magnetic layer 2802 also has a portion near the trailing edge that has a constant width (i.e. a portion that does not taper). This advantageously allows the track-width of this trailing edge portion to be very accurately controlled to a desired with of, for example, 70 nm.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head, comprising:
   providing a substrate;
   depositing a first layer of material that is resistant to reactive ion etching (RIE stop layer) over the substrate;
   depositing an alumina layer over the substrate;
   forming an opening in the alumina layer, the opening being configured to define a write pole;
   depositing a first magnetic layer into the opening in the alumina layer;
   performing a first chemical mechanical polishing to remove a portion of the first magnetic layer;
   depositing a second magnetic layer over the first magnetic layer; and
   performing a second chemical mechanical polishing.

2. A method as in claim 1, further comprising, after depositing the alumina layer:
   depositing a second layer of material that is resistant to reactive ion etching (RIE mask);
   depositing an image transfer layer over the REI mask;
   depositing a resist layer over the image transfer layer;

photolithographically patterning and developing the photoresist layer to form an opening in the resist layer that is configured to define a write pole;

performing a first reactive ion etching to transfer the image of the resist layer onto the image transfer layer;

performing a material removal process to transfer the image of the image transfer layer onto the RIE mask; and performing second reactive ion etching to form the opening in the alumina layer.

3. A method as in claim 2 wherein the image transfer layer comprises a soluble polyimide.

4. A method as in claim 2 wherein the RIE mask comprises Ru, Rh or NiCr, Cr, Ta.

5. A method as in claim 2 wherein the material removal process comprises reactive ion etching.

6. A method as in claim 2 wherein the material removal process comprises a third reactive ion etching process that is performed after the first reactive ion etching and before the second reactive ion etching.

7. A method as in claim 2 further comprising, terminating the second reactive ion etching when the RIE stop layer has been reached.

8. A method as in claim 1 further comprising, after forming the opening in the alumina layer and before depositing the first magnetic layer, depositing a layer of material that is resistant to chemical mechanical polishing.

9. A method as in claim 8 wherein the layer of material that is resistant to chemical mechanical polishing comprises Ru.

10. A method as in claim 1 wherein the RIE stop layer comprises Ru or Rh, NiCr, Cr or Ta.

11. A method as in claim 1 wherein the first and second magnetic layers are deposited by sputter deposition.

12. A method as in claim 2 wherein the second reactive ion etching is performed using a chlorine based chemistry.

13. A method as in claim 1 further comprising after performing the first chemical mechanical polishing and before depositing the second magnetic layer, depositing a thin non-magnetic layer.

14. A method as in claim 13 wherein the thin non-magnetic layer comprises alumina deposited by atomic layer deposition.

15. A method as in claim 14 wherein the thin alumina layer has a thickness not greater than 3 nm.

16. A method for manufacturing a magnetic write head, comprising:
providing a substrate;
depositing a layer of material that is resistant to reactive ion etching (RIE stop layer) over the substrate;
depositing a layer of alumina over the RIE stop layer;
depositing an etching layer over the layer of alumina;
forming a mask structure over the etching layer, the mask structure having an opening that is configured to define a write pole;
performing a first reactive ion etching to transfer the image of the mask structure onto the etching layer;
performing a second reactive ion etching to transfer the image of the mask structure onto the layer of alumina;
depositing first layer of magnetic material;
depositing a thin layer of non-magnetic material;
depositing a second layer of magnetic material; and
performing a chemical mechanical polishing.

17. A method as in claim 16, wherein the first and second reactive ion etchings form an opening in the etch stop layer and the alumina layer, and wherein the first layer of magnetic material only partially fills the opening.

18. A method as in claim 16 wherein the etch stop layer comprises TaO or Ta or Ta2O5.

19. A method as in claim 16, wherein:
the etch stop layer comprises TaO or $Ta_2O_5$ or Ta;
the first reactive ion etching forms an opening in the etch stop layer having first a first sidewall;
the second reactive ion etching forms an opening in the etch stop layer having a second side wall; and
the first side wall is closer to vertical than the second side wall.

20. A method as in claim 1 wherein the non-magnetic layer comprise alumina deposited by atomic layer deposition.

21. A method as in claim 20 wherein the non-magnetic layer has a thickness not greater than 3 nm.

22. A method as in claim 16 wherein the first magnetic layer is deposited by electroplating and the second magnetic layer is deposited by sputter deposition or ion beam deposition.

23. A method for manufacturing a magnetic write head, comprising:
providing a substrate;
depositing a first layer of material that is electrically conductive and is resistant to reactive ion etching (RIE stop layer) over the substrate;
depositing an alumina layer over the substrate;
forming an opening the alumina layer, the opening being configured to define a write pole;
electroplating first magnetic layer into the opening in the alumina layer;
depositing a thin non-magnetic material into the opening in the alumina layer; and
depositing a second magnetic layer over the first magnetic layer.

24. A method as in claim 23 wherein the thin non-magnetic layer and the second magnetic layer are deposited by sputter deposition or ion beam deposition.

25. A method as in claim 23 wherein the thin non-magnetic layer comprises alumina having a thickness not greater than 3 nm.

* * * * *